United States Patent [19]

Mitchell

[11] 4,445,591
[45] May 1, 1984

[54] LIGHTWEIGHT, PORTABLE HUNTER'S TREE STAND

[76] Inventor: Paul M. Mitchell, 1044 Marine Dr., Bellingham, Wash. 98225

[21] Appl. No.: 457,573

[22] Filed: Jan. 13, 1983

[51] Int. Cl.³ .................... E04G 5/08; A01M 31/02; A45F 3/26; A47C 9/10
[52] U.S. Cl. ................................. 182/222; 182/92; 182/187
[58] Field of Search ............... 182/222, 223, 187, 188, 182/92, 90, 115; 47/42, 43

[56] References Cited

U.S. PATENT DOCUMENTS

| | | | |
|---|---|---|---|
| 2,855,980 | 10/1958 | Konieczka | 182/187 |
| 3,419,108 | 12/1968 | Mobbs | 182/187 |
| 3,719,252 | 3/1973 | Tiley | 182/187 |
| 3,762,502 | 10/1973 | Lawson | 182/223 |
| 3,944,022 | 3/1976 | Ming | 182/187 |
| 3,949,835 | 4/1976 | Butler | 248/219.4 |
| 3,961,686 | 6/1976 | Starkey | 182/187 |
| 4,139,080 | 2/1979 | Wells | 182/115 |
| 4,321,982 | 3/1982 | Strickland | 182/187 |

*Primary Examiner*—Reinaldo P. Machado
*Attorney, Agent, or Firm*—Hughes, Barnard & Cassidy

[57] ABSTRACT

A hunter's tree stand (10) comprising a planar seat member (16) of generally rectilinear form having a pair of opposed generally V-shaped notches (18, 19) formed in its opposite ends which are adapted to engage and partially surround, in intimate face-to-face relation, the facing portions of a pair of diverging tree branches (14, 15) at the fork (11) formed thereby, a sharp, laterally projecting V-shaped metal knife-like edge (20) secured to the undersurface of the seat member (16) in juxtaposition to and projecting laterally from the first V-shaped notch (18), and an L-shaped bracket (22) releasably secured to the undersurface of the seat member (16) by means of one or more bolt and nut combinations (29, 31) for permitting lateral extension of said L-shaped bracket (22) relative to the second of the V-shaped notches (19) to permit the depending bracket leg (25) to be placed in face-to-face contact with the other of the diverging branches (14) and positively secured thereto by one or more threaded fasteners (26) extending therethrough. The hunter's tree stand (10) may optionally be provided with a soft cushion (36) to render the stand more comfortable in use and/or with a safety line (32) which can be tied off to one of the diverging tree branches.

8 Claims, 4 Drawing Figures

U.S. Patent     May 1, 1984     4,445,591
FIG. 1
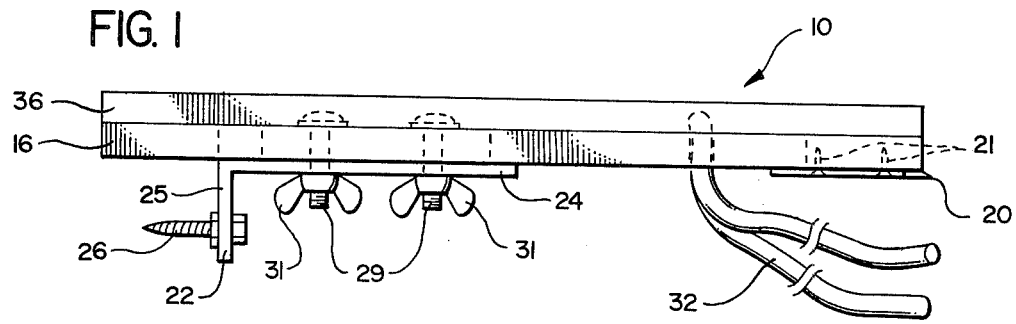
FIG. 2
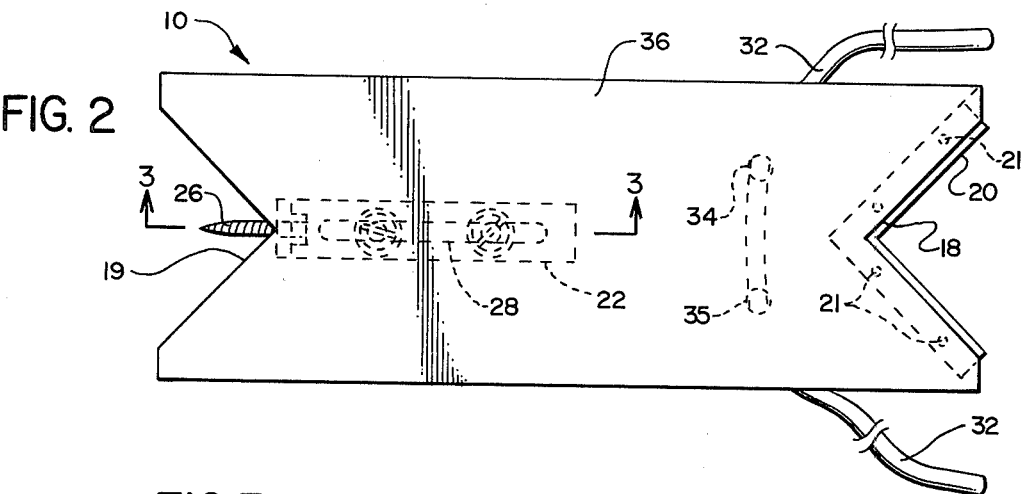
FIG. 3
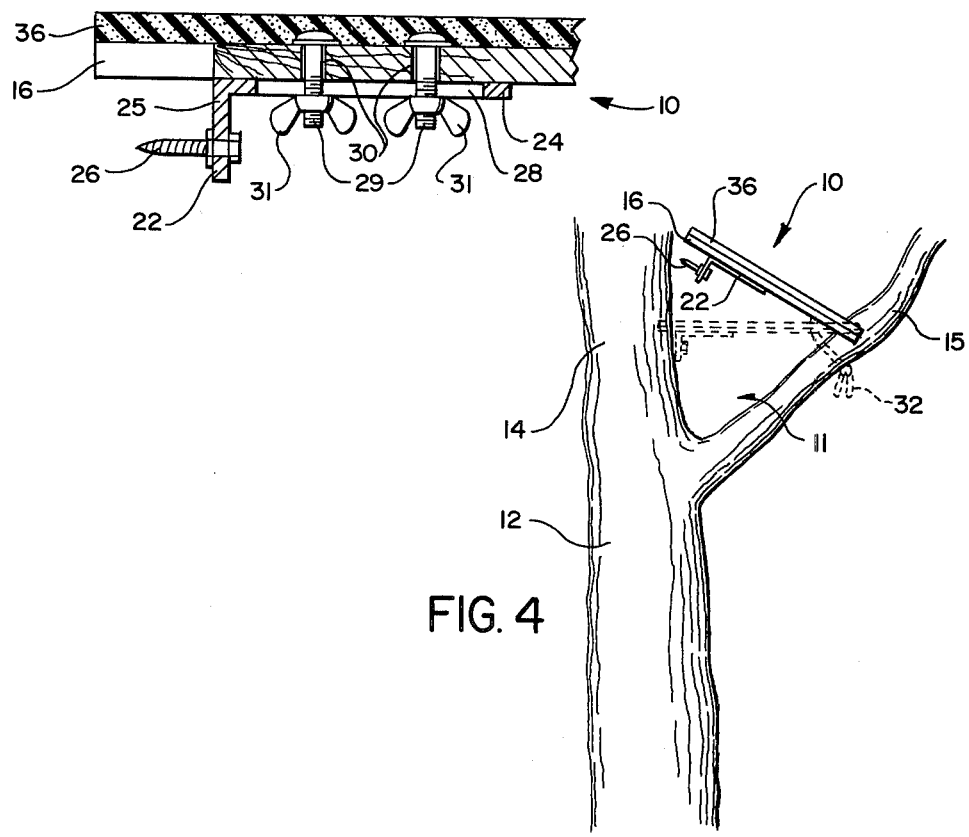
FIG. 4

LIGHTWEIGHT, PORTABLE HUNTER'S TREE STAND

TECHNICAL FIELD

The present invention relates generally to a hunter's tree stand; and, more particularly, to a simple, compact, lightweight and inexpensive hunter's tree stand characterized by its portability, ease of erectability, and its use of only a relatively few readily available components, thereby enabling the hunter to transport the tree stand from place to place on or in a backpack or the like, and to quickly and easily install the tree stand in the fork of a tree defined by a pair of divergent tree branches or the bifurcation between a branch and the tree's trunk. The tree stand of the present invention includes provision for firmly anchoring the stand to the tree for insuring a stable seat for the hunter; yet, it requires relatively few moving components.

BACKGROUND ART

Prior to the advent of the present invention, there has been a long-felt need for a simple, lightweight, portable and inexpensive hunter'tree stand which can be easily transported from place to place and which permits of ease of mounting in or on the tree to provide a stable seat for the hunter as he waits for the particular game being sought. Numerous types of tree stands have been developed over the years and are presently available in the marketplace. For the most part, however, such tree stands are of the type which are intended to be supported on the side of the tree in cantilever fashion. Such tree stands commonly employ rather complex and cumbersome mounting arrangements in an effort to provide a safe and stable perch; but, despite their complexity, such stands have traditionally proved to be unstable and unsafe in use and, further, they are relatively expensive and not easily transported by the hunter.

Typical of the foregoing types of tree stands are those disclosed in, for example: U.S. Pat. No. 2,855,980—Konieczka; U.S. Pat. No. 3,419,108—Mobbs; U.S. Pat. No. 3,949,835—Butler; and, U.S. Pat. No. 3,961,686—Starkey. In general, each of the foregoing patents discloses a portable seat that can be utilized by a hunter and which incorporates support means adapted to engage and/or bite into one side of a tree or pole to form a cantilever-type seat extending laterally from the side of the tree, and suitable chains, cables or straps associated therewith and adapted to extend circumferentially around the tree for holding the stand in place. Generally, such devices tend to be difficult to install, particularly when the hunter desires to mount the seat at an elevation of 10', 15', or more, above ground level. The support elements that must be incorporated with such devices are not only quite cumbersome and heavy, but they are also difficult to stow and transport from place to place.

A somewhat modified and simplified portable tree seat has been disclosed in U.S. Pat. No. 3,719,252—Tiley, which includes a seat having a centrally disposed screw-threaded support rod adapted to be screwed directly into the tree in a horizontal plane and a pair of V-shaped legs having pointed lower extremities with the V-shaped legs being hingedly connected to the seat at its outboard end and the free extremities imbedded into the tree. While such a tree stand is characterized by its lightness in weight and its portability, the cantilever nature of the device does not provide a stable seat characterized by its ability to support the weight of the average adult hunter.

In yet another approach disclosed in U.S. Pat. No. 3,944,022—Ming, the patentee provides a tree stand having tubular runners which are interconnected by a pair of crossbars that are movable towards and away from one another along the runners with each crossbar being provided with teeth projecting in a horizontal plane towards the other crossbar. One crossbar is in the form of a stand or seat having a V-shaped notch at its inboard end and with teeth projecting inwardly towards the tree from the V-shaped notch. Thus, it is contemplated that the unit be disassembled and positioned about the tree with the stand and V-shaped notch engaged with one side of the tree, at which point the second crossbar is again installed on the runners and moved into clamping relationship with the trunk of the tree. In essence, the device contemplates a cantilever-type support extending laterally from the side of the tree.

In U.S. Pat. No. 4,139,080—Wells, the patentee discloses a hunter's tree stand employing a platform-like member having notches in its opposed ends and adapted to slide down between two diverging tree branches and to be jammed in position therebetween. In an attempt to improve stability, the tree stand includes hinged legs formed on its undersurface together with a suitable turnbuckle arrangement for forcing the legs laterally apart and into engagement with the two diverging branches.

However, despite the available types of hunter's tree stands as exemplified by the foregoing patents, the need persists for a lightweight, inexpensive and highly portable tree stand employing relatively few movable components and which not only permits of ease in portability, but also ease in erection and which insures a firm, stable and safe seat for the hunter irrespective of the hunter's size or weight.

SUMMARY OF THE INVENTION

A simple, compact, lightweight and inexpensive hunter's tree stand is disclosed which is characterized by its ease of portability and erectability and which employs relatively few components and only a single movable or adjustable component; yet, which provides a highly stable and relatively safe and comfortable above-ground perch for a hunter capable of supporting hunters of virtually any age, size and/or weight for prolonged periods of time. In the exemplary form of the invention herein disclosed, the hunter's tree stand comprises a planar seat member of generally rectilinear form and which can be formed from a wide range of inexpensive, lightweight yet relatively strong, and readily available materials such, for example, as wood, plywood, fabricated and/or extruded aluminum materials, or the like. The planar seat member is provided with a pair of opposed generally V-shaped notches in its opposite ends which are adapted to engage and partially surround, in intimate face-to-face relation, the facing portions of a pair of divergent tree branches at the fork defined thereby and/or at the bifurcation between the main tree trunk and an upwardly and outwardly extending branch. A sharp V-shaped metal knife-like element is permanently affixed to the lower surface of the planar seat member in juxtaposition to a first of the pair of V-shaped notches and projects laterally therefrom for biting engagement with one of the diverging tree branches; while an L-shaped bracket is adjustably secured to the lower surface of the planar seat member in position to be moved laterally towards the other divergent tree branch along a line bisecting the second of the V-shaped notches and thereafter releasably locked to the seat member, with such L-shaped bracket including threaded fastener means extending laterally through its downwardly depending leg for permitting the L-shaped bracket to be fixedly secured to the other diverging branch and thereby providing a stable, safe platform or seat which is anchored in the tree fork and positively attached to both of the diverging tree branches. For purposes of enhancing safety and stability, the exemplary tree stand may optionally include a safety cord or line which can be threaded through a pair of openings extending vertically through the seat member—for example, adjacent the end thereof proximate to the V-shaped knife member—for permitting the tree stand to be securely tied to the adjacent tree branch. Further, to enhance the comfort characteristics, a padded cushion may be optionally provided on the upper surface of the planar seat member.

More specifically, it is a general aim of the invention to provide a simple, lightweight, inexpensive hunter's tree stand characterized by its stability, safety and ease of portability and erectability yet, which can be easily and economically fabricated from a wide range of readily available inexpensive materials, thereby overcoming the disadvantages inherent with, and in, known conventional hunter's tree stands of the type hereinabove described.

In one of its important aspects, it is an object of the present invention to provide a compact, lightweight, generally flat hunter's tree stand which permits of ease in portable storage during hikes to, from, and/or between remote hunting sites; yet, wherein the hunter can quickly and easily install the tree stand at a desired location in the fork of a tree by the simple expedient of forcing the stand into a firm, stable, horizontal position between the divergent tree branches defining such fork and wherein the tree stand can be positively anchored in such stable position by means of a stationary knife edge at one end of the stand and an adjustable bracket including one or more laterally extending threaded fasteners disposed at the opposite end of the stand; and, wherein such bracket constitutes the only movable or adjustable component of the overall tree stand.

DESCRIPTION OF THE DRAWINGS

These and other objects and advantages of the present invention will become more readily apparent upon reading the following detailed description and upon reference to the attached drawings, in which:

FIG. 1 is a side elevational view of a hunter's tree stand made in accordance with the present invention;

FIG. 2 is a plan view of the tree stand shown in FIG. 1;

FIG. 3 is a fragmentary, enlarged, sectional view taken substantially along the line 3—3 in FIG. 2 and illustrating details of the adjustable bracket employed for fastening one end of the tree stand to the tree; and, FIG. 4 is a fragmentary, diagrammatic side elevational view here illustrating the tree stand of the present invention being secured in the fork of a tree defined by a pair of divergent branches, with the tree stand here being shown in solid lines during the initial stages of mounting in the tree and in phantom lines when fully mounted.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Turning to the drawings, there has been illustrated an exemplary hunter's tree stand, generally indicated at 10, embodying the features of the present invention and of the type adapted to be firmly anchored in the fork, generally indicated at 11 in FIG. 4, of a tree 12 having a pair of upwardly divergent tree branches or, alternatively and as best shown in FIG. 4, a main trunk 14 and an outwardly and upwardly extending major branch 15. In the exemplary form of the invention here shown and described, the tree stand 10 is formed from a flat, rigid, lightweight, planar seat member 16 which may be easily and conveniently formed from suitable sheet materials such, for example, as wood, plywood, fabricated and/or extruded aluminum sheet material, or the like. While the particular dimensions employed are not critical to the invention, excellent results have been achieved by forming the seat member 16 of ¾ inch plywood having an overall length on the order of about 22 inches and a width on the order of about 8 inches where such dimensions have been found to render the tree stand usable with most commonly encountered fork-defining divergent tree branch configurations.

In carrying out the present invention, provision is made for shaping the seat member 16 so as to enable the tree stand 10 to readily conform to the facing rounded exterior portions of the diverging tree branches—e.g., trunk 14 and branch 15 (FIG. 4)—in the fork 11 of a suitably located tree 12. To accomplish this, the opposite ends of the seat member 16 are respectively provided with first and second V-shaped notches 18, 19 as best shown in FIG. 2. Again, while other notch configurations may be employed such, for example, as arcuate or curved shapes, the use of V-shaped notches 18, 19 has been found to provide excellent results in that two spaced points of face-to-face contact are established between each end of the tree stand 10 and each of the adjacent branches 14, 15 irrespective of the diameter of the adjacent branches. Moreover, those skilled in the art will appreciate that the V-shaped notches 18, 19 may be configured to define other than an included angle of 90° as here shown; but, where the tree stand 10 is dimensioned as hereinabove indicated, excellent results have been attained in terms of stability and safety with a wide range of different size tree branches where the V-shaped notches have a maximum depth at the apical end of on the order of about 3½ inches and define an included angle on the order of about 90°.

In keeping with the invention, provision is made for establishing a positive, stable anchored engagement between the hunter's tree stand 10 and the diverging tree branches 14, 15; yet, wherein such stable anchored engagement is attained with a minimum of components and, indeed, with anchoring means which include only a single movable or adjustable element. To accomplish this, one end of the planar seat member 16—here, the end proximate the first V-shaped notch 18—is provided with a fixed integral stationary anchoring device in the form of a V-shaped sharp knife edge 20 which is secured to the lower surface of the seat member 16 by threaded fasteners 21 or the like, while the opposite end of the seat member 16 includes laterally adjustable support bracket defining means in the form of an L-shaped angle iron 22 or the like having: (i) a horizontally disposed leg 24 adapted to be releasably locked to the lower surface of the seat member 16; and (ii), a right angle depending leg 25 normal to the planar seat member 16 with leg 25 including one or more horizontally extending screws or similar threaded fasteners captively retained thereon and extending therethrough, there being one such threaded fastener 26 provided in the exemplary device. To permit releasable lockable adjustment of the L-shaped bracket 22 with respect to the seat member 16, the horizontal leg 24 is provided with a longitudinally extending central keyway or slot 28 through which extend the threaded ends of a pair of bolts 29 which pass through openings 30 formed in and extending through the seat member 16. Wing nuts 31 or the like are provided for releasably locking or clamping the L-shaped bracket 22 to the lower surface of seat member 16 in any desired position of lateral extension relative to the second proximate V-shaped notch 19.

Thus, the arrangement is such that when the hunter locates a favorable site for awaiting the particular game being sought, it is merely necessary to position the tree stand 10 in a suitable tree fork 11, initially in the solid line position shown in FIG. 4 with the laterally projecting knife edge 20 engaged with the upwardly and outwardly diverging branch 15. The hunter then forces the knife edge 20 into biting engagement with branch 15 and pivots the stand downwardly into a horizontal position as indicated in broken lines in FIG. 4. Wing nuts 31 are then backed off to permit lateral adjustment of the L-shaped bracket 22 which is shifted laterally towards the main tree trunk 14 or other diverging branch and, when in face-to-face engagement therewith, the threaded fastening means 26 are screwed into the trunk or tree branch 14. The wing nuts 31 are then retightened to clamp the bracket to the seat member 16 so as to form a stable and safe perch in the fork 11 of tree 12. If desired, the tree stand 10 may be optionally provided with a safety cord 32 which is threaded through a pair of openings 34, 35 adjacent V-shaped notch 18, thereby enabling the tree stand to be tied to the diverging branch 15.

Since it is contemplated that hunters may be required to remain on the hunter's tree stand 10 of the present invention for prolonged periods of time while awaiting the game being sought, the illustrative tree stand 10 may optionally be provided with a padded soft cushion 36 formed of and/or containing a foam rubber material or the like. Such cushion 36 may be removably secured to the planar seat member 16 by any suitable means (not shown) or, alternatively, may be adhesively bonded to the seat.

Thus, those skilled in the art will appreciate that there has herein been described a simple, compact, lightweight hunter's tree stand which can be easily stowed in or on a backpack or the like for transport from site to site preparatory to use; yet, which can be easily installed within a fork of a tree at any desired height to provide a stable, safe and positively anchored seat or platform by the simple expedient of adjusting only a single movable component and threadably securing that component to one of the two diverging tree branches.

What is claimed is:
1. A lightweight, portable hunter's tree stand comprising, in combination:
   (a) a rigid planar seat member having opposed ends;
   (b) first and second V-shaped notches formed in respective ones of said opposed ends of said planar seat member for mounting in partially surrounding face-to-face engagement with the facing sides of a pair of diverging tree branches;
   (c) means secured to said planar seat member and defining a sharp knife-like edge projecting laterally beyond the edge of said first V-shaped notch formed in one end of said seat member for biting engagement with one of the pair of divergent tree branches for securely holding one end of said tree stand in stable engagement therewith;
   (d) laterally extending bracket defining means releasably secured to said planar seat member adjacent said second V-shaped notch with freedom for movement into engagement with the other of the pair of divergent tree branches;
   (e) first means for releasably locking said bracket defining means to said planar seat member in any desired preselected position where one portion of said bracket defining means is in generally face-to-face relation with the other of the pair of divergent tree branches; and,
   (f) second means extending through said bracket defining means for fixedly securing said seat member to the other of the pair of divergent tree branches so that said planar seat member is securely and stably fixed in position between the divergent tree branches and capable of supporting the weight of a hunter thereon.

2. A hunter's tree stand as set forth in claim 1 wherein cushioning means are secured to the upper surface of said planar seat member.

3. A hunter's tree stand as set forth in claim 1 wherein said seat member is provided with a pair of through openings extending therethrough and a safety line is threaded through said openings for permitting said stand to be tied to one of the pair of diverging tree branches.

4. A hunter's tree stand as set forth in claim 1 wherein said seat member is provided with a pair of through openings extending therethrough, a safety line is threaded through said openings for permitting said stand to be tied to one of the pair of diverging tree branches, and cushioning means are secured to the upper surface of said planar seat member.

5. A hunter's tree stand as set forth in claim 1 wherein said laterally extending bracket defining means comprises an L-shaped bracket having a horizontally extending first leg and a depending vertically extending second leg normal thereto, said first leg having a centrally disposed longitudinally extending keyway slot formed therein, means extending through said planar seat member and said slot for releasably clamping said first leg to the lower surface of said seat member in any desired position of lateral extension relative to said seat member, and said second means extending through said bracket defining means for fixedly securing said seat member to the other of said diverging tree branches comprises threaded fastening means projecting laterally through said second leg.

6. A hunter's tree stand as set forth in claim 5 wherein cushioning means are secured to the upper surface of said planar seat member.

7. A hunter's tree stand as set forth in claim 5 wherein said seat member is provided with a pair of through openings extending therethrough and a safety line is threaded through said openings for permitting said stand to be tied to one of the pair of diverging tree branches.

8. A hunter's tree stand as set forth in claim 5 wherein said seat member is provided with a pair of through openings extending therethrough, a safety line is threaded through said openings for permitting said stand to be tied to one of the pair of diverging tree branches, and cushioning means are secured to the upper surface of said planar seat member.

* * * * *